United States Patent Office 3,493,536
Patented Feb. 3, 1970

3,493,536
STABILIZED RESINS CONTAINING BISMUTH OR ANTIMONY COMPOUNDS AND DIAROYL METHANES
Lewis Bernard Weisfeld, Highland Park, N.J., assignor to Carlisle Chemical Works, Inc., Reading, Ohio, a corporation of Ohio
No Drawing. Continuation-in-part of application Ser. No. 457,832, May 21, 1965. This application Sept. 5, 1968, Ser. No. 757,787
Int. Cl. C08f 45/56, 45/58; C08g 51/58
U.S. Cl. 260—45.75                                9 Claims

ABSTRACT OF THE DISCLOSURE

The light sensitivity imparted to polymeric compositions by a content of antimony or bismuth compounds is obviated by the addition of a diaroyl methane.

This application is a continuation-in-part application of my pending application Ser. No. 457,832, filed May 21, 1965, now abandoned.

This invention relates to light stable resinous compositions containing metals or metal compounds which are light sensitive or impart increased light sensitivity to the resinous composition.

Light colored resinous compositions retain their light color and clarity for extended periods of time when stabilized against the influence of sunlight, or more particularly ultra-violet light, by addition of conventional ultraviolet stabilizers such as certain benzophenones and benzotriazoles. However, it has been observed that stabilization with such commercially available UV-absorbers is insufficient when the resinous compositions contain bismuth or antimony compounds, particularly compounds containing a Bi—O—, Bi—S—, Sb—O— or Sb—S— group, whereby, in addition, halogen may be linked directly or indirectly to the metal atom. Resinous articles or coatings which contain such compounds are subject to discoloration or darkening, and no effective protection against such deterioration has been heretofore available.

Bismuth compounds such as bismuthyl chloride are used essentially as pearlescent ingredients in resinous compositions, and antimony oxides and other antimony compounds have been proposed as flame proofing agents. Various organic antimony compounds are excellent heat stabilizers but could not be used to any large extent because of their light sensitizing properties.

U.S. Patent No. 2,924,532 to Dereich is directed to the use of highly chlorinated aliphatic hydrocarbon materials as flame retardants for polymers and the use of organic antimonyl compounds of a special type as synergists in the flame retarding action.

The patent states, as has been well known in the art, that highly chlorinated materials, such as those used in the patent for flame-proofing effects, decompose under the influence of heat, light and moisture and mentions the use of well known heat and light stabilizers and ultra-violet screening agents for protecting against such decomposition.

According to my discoveries the harmful effects of light sensitivity are due not solely to chlorine-containing materials, as suggested by the above-mentioned patent, but, in addition, are caused by the presence of a bismuth or antimony compound. My investigations have also shown that the most conventional stabilizers against the harmful effects of light on chlorine-containing polymers are ineffective in polymers which also contain bismuth or antimony compounds. I have found that materials which are substantially ineffective as light stabilizers for the usual chlorine-containing materials and polymers (i.e., not containing bismuth or antimony compounds) provide stabilizing action against the sensitizing action of the bismuth or antimony compound, even though conventional stabilizers may be needed to stabilize against the inherent light sensitivity of the chlorine-containing material or polymer itself. In fact, I have found that the light sensitizing action of the bismuth or antimony compounds takes place when such compounds are present in polymers, and resins which do not contain chlorine and even in non-polymeric materials which do not contain chlorine. My investigations thus support the theory that the light sensitizing action of bismuth and antimony compounds involves an entirely different phenomenon from the well known light sensitivity phenomenon inherent in chlorine-containing materials and polymers.

I believe that the common denominator for the harmful effects of the compounds of said two metals is the tendency of said metal ions to pass readily into photo-induced transition states in which they react with the resinous environment and induce discoloration.

It is, therefore, a principal object of the invention to provide systems in which the harmful effects of said metal compounds are eliminated or reduced.

Other objects and advantages will be apparent from a consideration of the specification and claims.

The above and related objects are accomplished by incorporating a diaroyl methane of the general formula

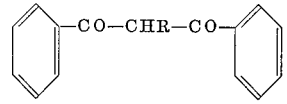

wherein R is hydrogen or a monovalent hydrocarbon radical, into a resinous composition which contains bismuth or antimony compounds, particularly such compounds which contain an Me—O— or Me—S— group, wherein Me is Bi or Sb.

In order to determine whether substituents on the benzene ring would modify the action of dibenzoyl methane, various substituted dibenzoyl methanes, particularly those having halogen, hydrocarbon, alkoxy, or hydroxyl substituents in the 2 or 2,2' and/or 4 or 4,4' position, were investigated and showed essentially the same effect as the dibenzoyl methane itself. It appears, therefore, that it is the 1,3-diaryldiketo configuration which is controlling and that substituents on the benzene rings have no or little effect.

It should be emphasized that the canonical mechanisms of photostabilization do not appear to be operating here. Thus, 2-hydroxy or 2,2'-dihydroxy substitution does not give any enhanced stabilizing effect over and above that of unsubstituted dibenzoyl methane; yet one skilled in the art realizes that such substitution is absolutely necessary for benzophenones or dibenzoyl methanes for conventional photostabilization or "U.V. absorption." See for example Tamblyn, U.S. Patent No. 3,240,752. For that matter, omission of the 2-hydroxy substituent on benzophenone converts it from a photostabilizer to a photosensitizer. I have concluded, therefore, that the sensitizing action of Bi and Sb compounds is quite different from the well known photosensitivity of resinous compositions, and that the stabilizing action obtained under the present invention is the result of mechanisms not previously obtained through conventional means.

Compounds covered by the above mentioned formula include dibenzoyl methane, 2-hydroxydibenzoyl methane, 4,4'-di-hydroxydibenzoyl methane, 1,1-dibenzoyl ethane, 2-hydroxy-5-methyldibenzoyl methane, 2-hydroxy-5-chlorodibenzoyl methane, 2-hydroxy-5-methyldibenzoyl methane, 5,5'-di-methyldibenzoyl methane, 1,1-dibenzoyl butane, respectively, 4-methoxy dibenzoyl methane, 4,4'-dimethoxydibenzoyl methane, 4-chloro-dibenzoyl methane, and 3,4 (3',4') - methylenedioxydibenzoyl methane, the latter as an example of a compound where the substituents on the rings ($R^1$ and $R^4$) are not alkoxy but bivalent —O—R—O— groups bound to vicinal positions of the benzene ring.

The compounds are employed in amounts of 0.1 to 5 percent by weight of the resinous composition and preferably in amounts of about 10 to 100% by weight of the bismuth or antimony present, calculated as metal. Larger proportions of diaroyl methane to metal can, of course, be used but hardly produce any better effect. The metal itself will be present in the resin generally also in amounts of about 0.1 to 5 percent by weight.

Dibenzoyl methanes have already been proposed as light stabilizers but their stabilizing effect in conventional resinous compositions which are free of bismuth or antimony ions, is far inferior to that of other UV stabilizers, and this is obviously the reason why they have never been used commercially.

Tamblyn, U.S. Patent No. 3,240,752, for example, shows dibenzoyl methane to provide no stabilization when compared to no stabilizer at all. Ebel, U.S. Patent No. 3,001,970, shows dibenzoyl methane as a light stabilizer for vinylidene chloride polymers.

As the examples hereinbelow show, dibenzoyl methanes are effective essentially to prevent color changes in resins due to the presence of bismuth and antimony compounds, and it will be of advantage to use them in combination with conventional light stabilizers such as resorcinol monobenzoate, alkylated hydroxyphenyl benzotriazoles, salicylic acid esters such as phenyl and other substituted salicylates, substituted e.g. hydroxy benzophenones, 1,3-dialkyl or alkyl aryl ketones, and others.

Resinous compositions, which contain bismuth or antimony compounds and are stabilized by diaroyl methanes, are haloethylene polymers, particularly vinyl halide resins such as vinyl chloride homopolymers and copolymers of vinyl chloride with other ethylenically unsaturated compounds, polyolefins, polystyrene, ABS copolymers, polyesters, epoxy resins, nitrocellulose resins and others.

The following examples are given to illustrate the invention and are not to be understood as limitations. All parts are given by weight.

Example 1

The following vinyl plastisol was prepared:

| | Parts |
|---|---|
| Poly(vinyl chloride) | 100.0 |
| Dioctylphthalate | 34.0 |
| Epoxidized soybean oil | 8.0 |
| Bismuth oxychloride | 2.4 |
| Stearic acid | 0.2 |
| Barium-cadmium laurate | 1.5 |

Samples of this composition were milled for 5 minutes at 330° F. separately with 0.6%, calculated on the poly (vinyl chloride), of each of the following stabilizers:

(1) Dibenzoyl methane
(2) Resorcinol monobenzoate
(3) 2(2'-hydroxy-5'-methyl phenyl) benzotriazole
(4) Benzoyl acetone
(5) Ethyl acetoacetate.

The blends were then exposed to the Fadeometer model FDA–R carbon arc device. Blend (1) showed only minimal darkening at the end of 14 hours while all the other blends showed already at the end of 3 hours a stronger darkening effect than that observed for (1) at the end of 14 hours exposure.

Increased addition of dibenzoyl methane increased the color stability until with an addition of 1.5% no color change could be observed even after 14 hours exposure.

Essentially the same results were obtained when the dibenzoyl methane was replaced by, respectively, 4-methoxy dibenzoyl methane, 4,4'-di-methoxydibenzoyl methane, 4-chlorodibenzoyl methane, and 3,4 (3',4')-methylenebisoxybenzoyl methane, the latter as an example of a compound where the substituents on the rings ($R^1$ and $R^4$) are not alkoxy but bivalent —O—R—O— groups bound to vicinal positions of the benzene ring.

Example 2

A standard composition (A) of 100 parts of poly(vinyl chloride) polymer, 2 parts of antimony tris(isooctyl acetomercaptide) as heat stabilizer, and 0.5 part of stearic acid as lubricant was prepared by thorough mixing for 5 minutes at 300° F. Similar compositions (B) and (C) were prepared with additional incorporation of 1 and 2 parts of dibenzoyl methane, respectively. Clear transparent sheets were pressed from the blends A, B, and C, and were exposed in the Fluoroscent Sunlamp-Blacklamp described by R. A. Kinmonth, Jr., SPE Transactions 4, No. 3, 229 (1964). The following results were noted:

(A) The resin composition containing the antimony compound but no dibenzoyl methane showed yellowing within 25 hours exposure (B) The resin composition containing 1.0 part of dibenzoyl methane as protection for the antimony compound showed, after an exposure of more than 50 hours, approximately the same degree of yellowing as specimen A.

(C) The resin composition containing 2.0 parts of dibenzoyl methane did not show any yellowing up to 100 hours.

Example 3

2.5 parts of bismuth chloride were milled into 100 parts of a non-pigmented acrylonitrile-butadiene-styrene resin (sold under the trade-name Kralastic ABS) to achieve a pearlescent effect. The batch was divided into two equal portions, and 1.0 part of dibenzoyl methane was added to one of said portions. Both portions were simultaneously exposed in the Fluorescent Sunlamp-Blacklamp. The portion without the dibenzoyl methane darkened appreciably within 50 hours while the portion protected by the incorporation of the dibenzoyl methane had darkened to the same degree only after 250 hours of exposure.

Similar results are obtained when polyethylene, polystyrene respectively are used instead of the ABS resin.

Example 4

This example is given to show the ineffectiveness of dibenzoyl methanes, compared with conventional light stabilizers, in resin compositions containing other metals than bismuth or antimony.

The following rigid poly(vinyl chloride) composition was prepared:

| | Parts |
|---|---|
| Geon 103 EP (homopolymer of vinyl chloride) | 100 |
| Dibutyltin bis (isooctylacetomercaptide) | 2.5 |
| Mineral oil | 0.5 |

The batch was divided into four portions which received, the parts being based on 100 parts of the poly (vinyl chloride):

(a) No additional stabilizer.
(b) 2(2'-hydroxy-5'-methyl phenyl) benzotriazole — 0.5
(c) Dibenzoyl methane — 0.5
(d) Dibenzoyl methane — 1.0

The compositions were milled 5 minutes at 320°, press polished, then placed in a Fluorescent Sunlamp-Blacklamp weathering device for 20, 50, 100 and 250 hours. Formulation (a) showed color development in 250 hours, while formulation (b) showed none at this time. Formulations (c) and (d) proved equivalent to each other, showing color development already in 100 hours though less than that for (a) in 250 hours; after 250 hours, the color development was stronger in (c) and (d) than that in sample (a).

Example 5

This example is presented to show the ineffectiveness of the conventional heat stabilizer, barium-cadmium laurate in resin compositions containing bismuth oxychloride, the effectiveness of dibenzoyl methane in providing stabilization of such compositions and the absence of a light stability problem when bismuth and/or antimony are absent.

The following poly(vinyl chloride) composition was prepared:

| Material: | Parts |
|---|---|
| Poly(vinyl chloride) | 100 |
| Dioctyl phthalate | 34 |
| Epoxidized soybean oil | 8 |
| Stearic acid | 0.2 |

Six samples of this composition were respectively mixed with the ingredient or ingredients as listed below except in case A were nothing further was added. The parts are based on 100 parts of poly(vinyl chloride).

(A)
None.

(B)

| | Parts |
|---|---|
| Barium-cadmium laurate | 2.0 |

(C)

| | |
|---|---|
| Barium-cadmium laurate | 2.0 |
| Bismuth oxychloride | 2.4 |

(D)

| | |
|---|---|
| Dibenzoyl methane | 1.0 |

(E)

| | |
|---|---|
| Barium-cadmium laurate | 2.0 |
| Bismuth oxychloride | 2.4 |
| Dibenzoyl methane | 1.0 |

(F)

| | |
|---|---|
| Bismuth oxychloride | 2.4 |
| Dibenzoyl methane | 1.0 |

Each resulting sample was then milled for about 5 minutes at a temperature of about 320 to 330° F., press-polished, cut into strips and then exposed to the Fadeometer Model FDA-R carbon arc device to determine the extent of light stability. Portions of each strip were exposed for, respectively, 0, 8, 16, 24, 32, 40 and 48 hours. In addition, milled, press-polished strips were placed in an oven maintained at 350° F. to determine the extent of heat stability. At intervals of 10 minutes a portion of each sample was removed over a period of 90 minutes except for Sample E which had turned jet black after 70 minutes.

As regards the light stability tests:

Sample A showed slight yellowing beginning between 8 and 16 hours exposure and continuing through 48 hours exposure.

Sample B showed no observable change in color or other visual property.

Sample C developed a distinct gray discoloration at 8 hours and developed successively into a much darker gray discoloration at 48 hours.

Sample D showed a slight yellowing extending without very much change over the entire 48 hours of exposure.

Sample E showed no apparent color change over the full 48 hours exposure.

Sample F also showed no apparent color change over the entire 48 hours exposure.

This example illustrates the light sensitizing effect imparted to the resin by the presence of bismuth oxychloride (Sample C) and illustrates the inability of the conventional stabilizer, barium-cadmium laurate, to desensitize the composition. On the other hand, this example shows that dibenzoyl methane substantially completely obviates the light sensitivity imparted by the presence of the bismuth compound even in the absence of the conventional stabilizer, barium-cadmium laurate.

As regards the heat stability tests:

Sample A became light amber at 40 minutes exposure time and progressively darkened to a dark amber at 70 minutes exposure time.

Sample B remained substantially colorless through 50 minutes exposure time and began to develop a very slight yellow tinge which remained essentially the same through 90 minutes exposure time.

Sample C which contained the pigment, bismuth oxychloride, remained light colored, a very light cream, even after 90 minutes exposure.

Sample D developed a pinkish yellow tinge at 30 minutes exposure which progressively developed to an amber color beginning at about 60 minutes and continued into a somewhat darker amber shade through 90 minutes.

Sample E remained essentially the same in coloration throughout, but took on a light cream tinge beginning at 60 minutes and extending to 90 minutes exposure.

Sample F began to take on an amber tinge at about 20 minutes and became progressively worse until a solid black color was reached between 60 and 70 minutes.

This example also shows that dibenzoyl methane alone provides very negligible heat stability, if any at all, when used in the absence of barium-cadmium laurate and that barium-cadmium laurate provides extensive heat stability.

I claim:

1. In a resinous composition containing up to 10 percent by weight of a metallic compound containing an Me—X group wherein Me is a member of the group consisting of bismuth and antimony and X is a member of the group consisting of oxygen, sulfur, and halogen, wherein said metallic compound provides a special effect, such as, heat stabilization, pigmentation or flame retardance but also imparts light sensitivity to said composition, that improvement comprising, the inclusion in said composition, as a desensitizer obviating the light-sensitivity imparted by said metallic compound to said resinous composition, of a material selected from the class consisting of diaroyl methanes of the formula

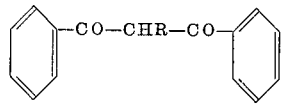

wherein R is a member of the group consisting of hydrogen and monovalent hydrocarbon radicals, diaroyl methanes of the above formula wherein at least one hydrogen of at least one of the benzene rings of the diaroyl methane is substituted by a member of the group consisting of halogen, hydroxy, alkoxy, and hydrocarbon radicals, and diaroyl methanes of the above formula wherein two vicinal carbon atoms of at least one of the benzene rings of the diaroyl methane are connected by an —O—R'—O— group wherein R' is alkylene, in an amount of 0.1 to 5 percent by weight of the total composition.

2. Composition as claimed in claim 1 wherein said desensitizer is dibenzoyl methane.

3. Composition as claimed in claim 1 wherein at least one hydrogen of at least one of the benzene rings of the diaroyl methane is substituted by a member of the group consisting of halogen, hydroxy, alkoxy, and hydrocarbon radicals.

4. Composition as claimed in claim 1 wherein two vicinal carbon atoms of at least one of the benzene rings of the diaroyl methane are connected by an

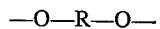

group wherein R is alkylene.

5. Composition as claimed in claim 1 wherein Me is bismuth.

6. Composition as claimed in claim 1 wherein the resinous composition is a heat-stabilized poly(vinyl chloride).

7. Composition as claimed in claim 2 wherein said metallic compound is bismuth oxychloride and said resinous composition is poly(vinyl chloride).

8. Composition as claimed in claim 2 wherein said metallic compound is antimony tris(isooctyl acetomercaptide) and said resinous composition is poly(vinyl chloride).

9. Composition as claimed in claim 2 wherein said metallic compound is bismuth chloride and said resinous composition is acrylonitrile-butadiene-styrene resin.

References Cited

UNITED STATES PATENTS

| 2,592,311 | 4/1952 | Meyer et al. | 260—45.85 |
|---|---|---|---|
| 2,824,847 | 2/1958 | Fath | 260—23 |
| 3,001,970 | 9/1961 | Ebel | 260—45.95 |
| 3,310,525 | 3/1967 | Lappin et al. | 260—45.95 |

FOREIGN PATENTS 514,329   7/1955   Canada.

DONALD E. CZAJA, Primary Examiner

V. P. HOKE, Assistant Examiner

U.S. Cl. X.R.

260—23, 37, 40, 41, 45.7, 45.95